3,284,440
PHOSPHATE ESTERS OF CYTOSINE ARABINOIDE AND PROCESS FOR PREPARING SAME
Arthur A. Patchett, Cranford, and Tsung-Ying Shen, Westfield, N.J., assignors to Merck & Co., Inc., Rahway, N.J., a corporation of New Jersey
No Drawing. Filed June 12, 1964, Ser. No. 374,809
20 Claims. (Cl. 260—211.5)

This invention relates to chemical derivatives of 1-$\beta$-D-arabinofuranosylcytosine and particularly to derivatives which will increase the usefulness of this compound as an antiviral agent.

The usefulness of 1-$\beta$-D-arabinofuranosylcytosine, commonly known as cytosine arabinoside or CA, in antiviral applications has been documented. Its activity against Herpes simplex infection of the eye is reported by G. E. Underwood in an article entitled "Activity of 1-$\beta$-D-Arabinofuranosylcytosine Hydrochloride against Herpes Simplex Keratitis," in volume III, pages 660–664, of Proc. Soc. Exptl. Biol., 1962. That article contains the following summary, "The antiviral activity of 5-iodo-2'-deoxyuridine in treating Herpes simplex keratitis in rabbits was confirmed. Another pyrimidine nucleoside, 1-$\beta$-D-arabinofuranosylcytosine hydrochloride, was found to be at least as effective as IUDR in treating this infection."

That article suggests the strong need for "having enough of the potential antiviral agent at the infected site for an adequate length of time." It was no doubt for that reason that, according to the article, in most instances an hourly application was made to the eyes.

This need for a constant application of the drug can be explained by the fact that it must pass through the cell membrane to reach the infecting virus. It is generally believed that a virus exercises its pathogenic activity by penetration into the cells of the infected organism and multiplication therein. Consequently, an antiviral agent must also penetrate through the cell membrane to come into contact with the virus or its enzymatic system in order to arrest or stop virus multiplication.

Care must, of course, be taken to make certain that the antiviral agent, or its carrier, is not of such a character that it weakens or destroys the cell membrane in order to pass therethrough and reach the invading virus. The relatively impervious nature of the cell membrane has consequently presented a substantial problem in the search for an effective antiviral agent. The small size of the virus or its associated enzymatic action makes it possible for it to enter into the cell interior and develop a pathogenic condition therein. Once inside the cell, it is relatively secure against antiviral agents as they must similarly reach the interior of the cell without causing damage to the membrane or to the cell itself.

In accordance with the present invention, it has been found that certain derivatives of CA are capable of passing through the cell membrane. Once within the cell, these derivatives are dissociated by the enzymes within the cell with the resultant release of the CA moiety. This internal release of the CA brings it into direct contact with the virus so that its therapeutic activity takes place.

The CA derivatives of the present invention may be represented by the structure:

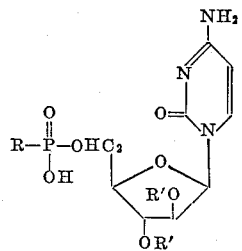

(I)

in which R is selected from the group consisting of

—OR''  (II)

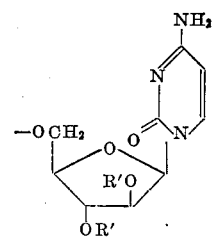

(III)

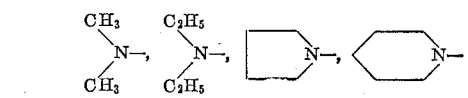

(IV)

and (V)

wherein $R_2$ is selected from the group consisting of —H, lower alkanoyl radicals (up to six carbon atoms) and benzoyl, and R'' is selected from the group consisting of —H, lower alkyl radicals (up to six carbon atoms), and phenyl-lower alkyl radicals. The preferred compounds are those wherein R is the radical shown at III.

The Compound I (in which R is —OH and R' is —H) can be made by condensing the known compound 1-$\beta$-D-arabinofuranosylcytosine with 2-cyanoethyl phosphate in the presence of a mild dehydrating agent such as dicyclohexylcarbodiimide, (DCC) and, in a suitable solvent, under anhydrous conditions. The cyanoethyl radical of the condensation product is removed by simple hydrolysis. This is illustrated in the following example.

Example 1.—1-$\beta$-D-arabofuranosylcytosine-5'-phosphate

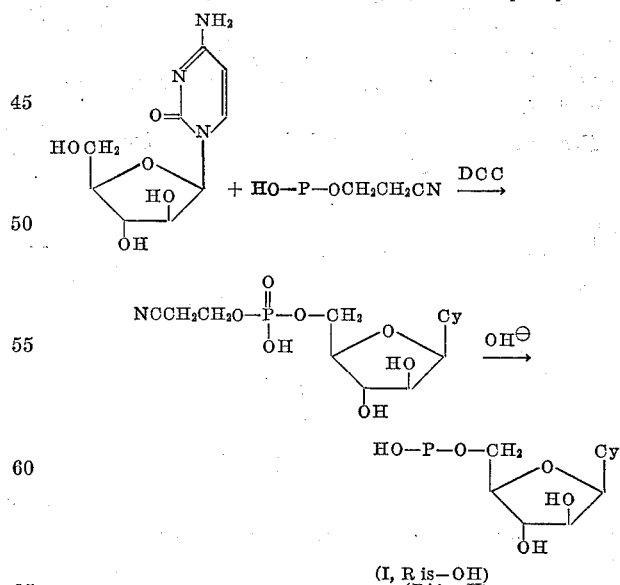

(I, R is—OH)
(R' is—H)

To a solution of 0.6 mmole of 1-$\beta$-D-arabofuranosylcytosine hydrochloride in 2 ml. of water are added 20 ml. of pyridine and a solution of the pyridine salt of 2-cyanoethyl phosphate [1] (0.30 mmole). The solution is con- ---
[1] Prepared in accordance with Biochemical Preparations, vol. 9, John Wiley and Sons, New York, 1962, p. 5.

centrated to dryness under reduced pressure at 30°, 20 ml. of anhydrous pyridine are added, and the resulting solution again concentrated to dryness. The addition of anhydrous pyridine and the concentration to dryness is repeated once more to insure removal of water. The residue is dissolved (except the crystalline pyridine hydrochloride) in 4 ml. of anhydrous pyridine and 2 ml. of freshly distilled dimethylformamide, and 1.0 g. of dicyclohexylcarbodiimide is added. The reaction mixture is stirred at room temperature in a well-stoppered flask for 24–48 hours. Four milliliters of water are added and, after 10 minutes at room temperature, the mixture is heated for 30 minutes in a boiling water bath. The solution is next concentrated to dryness and the residue treated with 20 ml. of water and 20 ml. of concentrated ammonium hydroxide at 70° for 2 hours in a loosely stoppered flask. The excess ammonia is removed by concentrating the solution to about 4 ml.; the resulting solution is diluted with 40 ml. of water and heated under reflux for 40 minutes. The solution is cooled and filtered, and the filtrate and washings are run onto a column (2 x 35 cm.) of Dowex–1X8 (formate) ion-exchange resin. The column is washed with water until the optical density of the effluent at 270 mμ is less than 0.1, and then elution is begun with 0.01 M formic acid. Fractions of about 10 ml. are collected. The elution is followed by the optical density of the fractions at 280 mμ. The fractions containing the product are combined and concentrated to dryness under reduced pressure. The residue is dissolved in about 1 ml. of water, and a few ml. of methanol are added slowly to promote crystallization of 1-β-D-arabofuranosylcytosine-5'-phosphate. This is the Compound I in which R is the radical shown at II with R'' being hydrogen.

The Compound I in which R is the radical shown at III, and in which R' is hydrogen, can be made by either of two different methods. According to one method, (A), the end compound of Example 1 is condensed with the starting compound VI of Example 1. The second method, (B), is the preferred method, and involves, as is demonstrated in Example 2 below, treating the starting Compound VI of Example 1 with an arylphosphorodichloridate with subsequent removal of the aryl group of the formed bis compound by hydrolysis to yield the desired bis compound. It is most preferred, however, instead of treating Compound VI directly, to convert it to the 2',3'-di-O-acyl-D-arabofuranosylcytosine via the formation of the 5'-trityl compound as demonstrated in Example 6.

*Example 2.—Bis-(1-β-D-arabofuranosylcytosine)-5',5''-phosphate*

[Method A]

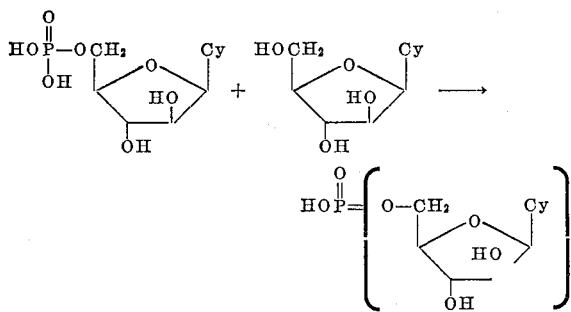

To a solution of 2.0 mmoles of 1-β-D-arabofuranosylcytosine-5'-phosphate in 20 ml. of dry pyridine is added 2 g. (10 mmoles) of dicyclohexylcarbodiimide and 2.0 mmoles of 1-β-D-arabofuranosylcytosine. The mixture is stirred in a sealed container at room temperature for 2 days. It is then diluted with 4 ml. of water and left for one hour at room temperature. The crystalline precipitate of 1,3-dicyclohexylurea is removed by filtration and the filtrate is evaporated to dryness in vacuo. The residue is dissolved in water and chromatographed on a column (2.5 x 50 cm.) of Dowex-1-X2 (formate). The column is eluated with increasing strengths of formic acid from 0.1 to 3 N formic acid. The product is obtained after the partial recovery of both starting materials.

[Method B]

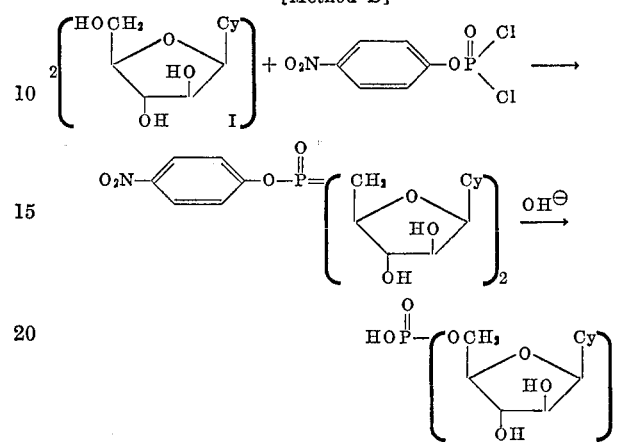

To a stirred solution of 5 mmoles of 1-β-D-arabofuranosylcytosine in 40 ml. pyridine is added slowly 6 mmoles of p-nitrophenylphosphorodichloridate with magnetic stirring and occasional cooling. The mixture is allowed to stand at room temperature for 24 hours, concentrated in vacuo to ca. 20 ml. and then slowly poured into 200 ml. of 0.25 N sodium hydroxide. After two hours the solution is passed through a column of Amerlite IR-120 (H) ion-exchange resin. The aqueous solution is extracted with ether and evaporated to dryness in vacuo. The crude product is purified by chromatography on a column of Dowex 1-X2 (formate) as before.

The Compound I in which is the radical shown at IV and in which R' is hydrogen can be made by condensing the end compound of Example I with methylenediphosphonic acid. This is illustrated in the following example.

*Example 3.—1-β-D-arabofuranosylcytosine-5'-methylene diphosphate*

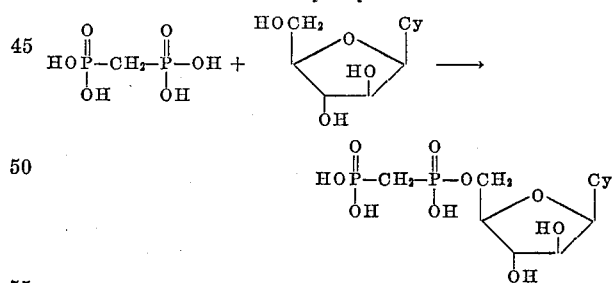

A mixture of 0.011 mole of methylenediphosphonic acid, 0.005 mole of 1-β-D-arabofuranosylcytosine, 0.02 mole of dicyclohexylcarbodiimide in 30 ml. pyridine and 4 ml. water is stirred vigorously at room temperature for 12 hours. The solution is filtered, diluted with 100 ml. water and extracted with 3 x 100 ml. ether. The aqueous solution is charged on to a 3 cm. x 50 cm. Dowex-1 (formate) column at pH 8. After washing with water (2.1) to remove pyridine, the column is eluted successively with solutions of 2 N formic acid, 2 N formic acid+0.05 M ammonium formate and 2 N formic acid+0.1 M. ammonium formate.

The fractions containing the product are combined and concentrated in vacuo to ca. 500 ml. The solution is treated with 30 g. of acid-washed activated charcoal (Norit A) after stirring for ½ hour. The charcoal is collected on a Celite filter and washed with 1.5 l. of water. The product is then eluted with 50% aqueous ethanol containing 1% concentrated ammonium hydroxide. The eluate is concentrated in vacuo at 20° and then lyophilized to a white solid as the diammonium salt of the product mixed with some deacetylated material, ammonium 1-β-D - arabofuranosylcytosine-5'-methylenedisphosphonate.

The Compound I in which R is one of the radicals shown at V and in which R' is hydrogen is made by condensing the end compound of Example 1 with the nitrogen-containing compound in the presence of dicyclohexylcarbodiimide. The N,N'-dicyclohexylcarbodiimide salt is removed by ion exchange. This is illustrated in the following example, using morpholine as the representative reactant:

*Example 4.—1-β-D-arabofuranosylcytosine-5'-phosphoromorpholidates*

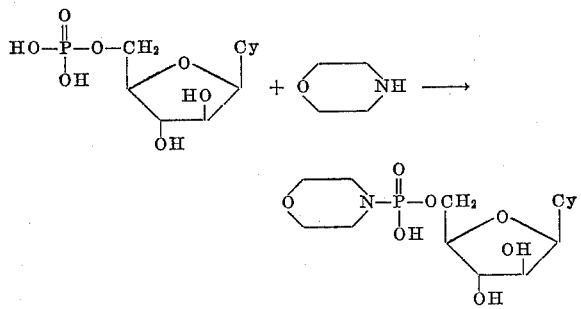

A solution of dicyclohexylcarbodiimide (4 mmoles) in t-butyl alcohol (15 ml.) is added dropwise to a refluxing solution of 1 mmole of 1-β-D-arabofuranosylcytosine-5'-phosphate in a mixture of 10 ml. water, 10 ml. t-butyl alcohol and 0.34 ml. (4 mmoles) of purified morpholine after 8–10 hours. The mixture is cooled to room temperature and filtered. The filtrate is evaporated in vacuo to remove the bulk of t-butyl alcohol, and the remaining aqueous solution is extracted three times with ether. Evaporation of the aqueous solution in vacuo to dryness gives the 4-morpholine N,N'-dicyclohexylcarboxamidine salt of the product.

The free acid of the above salt is obtained by removing the N,N'-dicyclohexylcarboxamidine ion with an equivalent amount of Amberlite IR–120 (H+) resin.

Neutralization of the free acid in water with an equivalent amount of desired base such as ammonium hydroxide, sodium hydroxide, choline, glucosamine, etc. gives the corresponding salt.

By substituting for morpholine, the compound corresponding to the other radicals shown at V, the corresponding end product is obtained.

The invention includes esters, i.e. when R'' is the residue of a lower aliphatic and phenylalkyl alcohols, of the phosphate and they can be made by adding the selected alcohol to the end compound of Example 1. The ethyl ester is made by the following example:

*Example 5.—1-β-D-arabofuranosylcytosine-5'-ethyl phosphate*

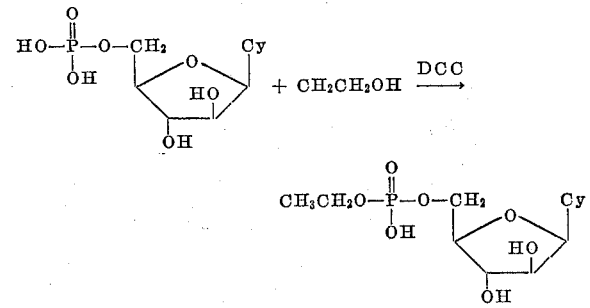

To a solution of 1-β-D-arabofuranosylcytosine-5'-phosphate (0.4 mmole) in 2 ml. pyridine and 98 ml. ethanol is added 2.0 mmoles of dicyclohexylcarbodiimide. The mixture is stirred at room temperature for 4–6 days until the starting material has completely disappeared as shown by paper chromatography. The solvent is evaporated in vacuo and the residual gum is partitioned between a mixture of ether and water. The aqueous solution is evaporated in vacuo to dryness and gives the pyridinium salt of the product.

In like manner, the methyl, isopropyl, butyl, benzyl, β-phenethyl, phenyl alkyl esters are prepared by substituting for ethanol the corresponding alcohol.

This 5'-ethyl, or like ester as just mentioned, can be obtained from the end compound of Example 2 so as to produce, for example:

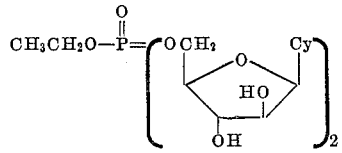

The compounds in which R' are other than hydrogen, namely a lower acyl or a benzoyl radical, are made by first converting the 1-β-D-arabinofuranosylcytosine to the desired 2',3' diester. The 5'-hydroxy group is first protected against this esterifying agent and this is conveniently accomplished by reaction with a triarylmethyl halide such as triphenylmethylchloride. The resulting 5'-O-trityl group is subsequently reconverted to the 5'-hydroxy group by hydrolysis.

The free amino group of the cytosine moiety will be acylated by the agent used to obtain the 2',3' diester, but this resulting amide group can preferentially be hydrolyzed with dilute acid to reobtain the free amino group without disturbing the 2',3' diester groups. This latter hydrolysis to a free amino group is not necessary as it is known that this hydrolysis will take place in the body after administration. In any event, when the N,2',3'-triacyl compound is treated in accordance with Method B of Example 2 to obtain the bis phosphate compound, the final treatment with base is effective to remove the aryl radical, the 2',3'-O-acyl groups, and the N-acyl group. The 2' and 3' oxygens may then be acylated by well-known techniques.

The following example illustrates the formation of the 2',3' diester derivatives.

*Example 6.—5'-O-trityl-D-arabofuranosylcytosine (Step A)*

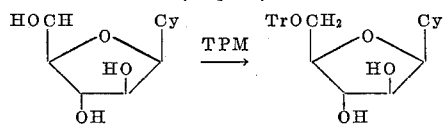

Triphenylmethylchloride (14 g.) is added to a mixture of 0.05 mole of D-arabofuranosylcytosine and 150 ml. dry pyridine. After stirring at room temperature for 2–4 days, the reaction mixture is poured into 1 l. of iced water. The precipitate is collected on a filter, washed with water and recrystallized to form methanol-acetone, M.P. 230.5–232° C.

*N⁴-acetyl-2',3'-di-O-acetyl-5'-O-trityl-D-arabofuranosylcytosine (Step B)*

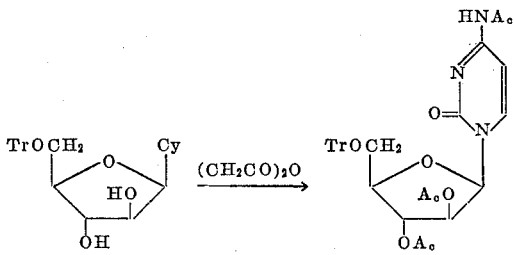

A solution of 3 g. of 5'-O-trityl-D-arabofuranosylcytosine in 40 ml. pyridine and 10 ml. acetic anhydride is kept at room temperature for 18 hours, and then poured into iced water (500 ml.) with vigorous stirring. The precipitate is recrystallized from ethylacetate, M.P. 256–258° C.

*2',3'-di-O-acetyl-D-arabofuranosylcytosine (Step C)*

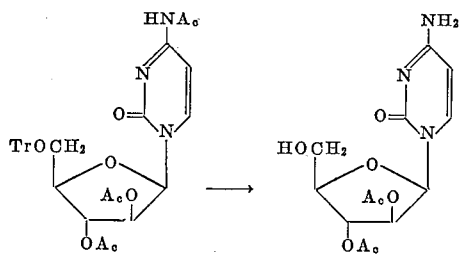

A solution of $N^4$-acetyl-2',3'-di-O-acetyl-5'- O-trityl-D-arabofuranosylcytosine (4.3 g. in 15 ml. 80% acetic acid is heated under reflux for 5 minutes, cooled, and evaporated in vacuo below 30%. The residue is triturated with 100 ml. ether, and the gummy solid is purified by counter current distribution using ethyl acetate-water as solvents. In addition to N,2',3'-tri-acetyl - D - arabofuranosylcytosine there is obtained a small yield of the desired product VII.

This latter product is subjected to the reactions of the foregoing Example 1 to Example 5 in order to obtain the derivatives of the invention. That is, the 5-hydroxyl group of VII is replaced with a phosphate radical as in Compound I, or with the other radicals shown at II, III, IV, and V, by the reactions of the preceding examples. In other words, Compound VII and its equivalents in which R' is as defined above, is utilized as is Compound VI, in the reactions of Examples 1 to 5.

If, instead of acetic anhydride, another lower acyl anhydride is used, such as propionic anhydride, the corresponding 2',3' diester is obtained. In like manner, the 2',3' dibenzoate is obtained. These esters can be used in Examples 1 to 5 inclusive to obtain the compounds of the invention.

The invention contemplates the use of an acyl chloride instead of the anhydride, to obtain the 2',3' diester. This is illustrated in the following example.

*Example 7.—2',3'-di-O-acetyl-5'-trityl-D-arabofuranosylcytosine*

To a solution of 5'-O-trityl-D-arabofuranosylcytosine (from Step A of Example 6) (0.1 mole) in 70 ml. glacial acetic acid is added 70 ml. of acetyl chloride. The mixture is stirred at room temperature for 18 hours, concentrated in vacuo and filtered. The crude mixture of 2',3'-di-O-acetyl-D-arabofuranosylcytosine hydrochloride is dissolved in ethanol and treated with Dowex-2 anion exchange resin (OH form) to liberate the free base.

Fractional crystallizations from ethanol give 2',3'-di-O-acetyl - D - arabofuranosylcytosine (Compound VII), as was obtained by Step C of Example 6. As explained in Example 6, this ester VII can be used in place of Compound IV to obtain the various corresponding derivatives of Examples 1 to 5 inclusive.

This Compound VII, for example, is converted to bis-(2',3'-di-O-acetyl-1-β-D-arabofuranosylcytosine) - 5',5''-phosphate in a similar manner as described in Example 2 (Method B). This yields the compound:

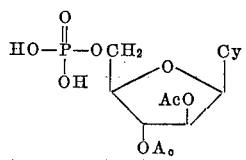

This above ester VII likewise is converted to the triester, ethyl-bis-(2',3'-di-O-acetyl-1-β-D-arabofuranosylcytosine)-5',5''-phosphate by the treatment of ethanol and dicyclohexylcarbodiimide as described in Example 5. This yields the compound:

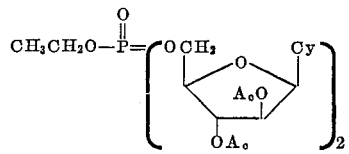

In like manner, the corresponding methyl, isopropyl, butyl, benzyl, β-phenethyl, phenyl esters are prepared.

When morpholine or one of the like compounds having the radicals shown at V is used in place of ethanol, the corresponding phosphoramides are obtained. Other compounds having the structure shown at I are apparent as proper selection of the reactants and use of the procedures of the examples will produce them. The invention includes, as well, the $N^4$ esters, as explained above as this will be hydrolyzed in the body. Also, the invention includes the formation of salts of the phosphate, such as the sodium or potassium salt as is common with phosphates in general to make them more acceptable in pharmaceutical formulations.

The compounds of the present invention are to be used in the same manner, for example, that CA was used in the above journal article by G. E. Underwood. The compounds will be especially effective against resistant strains of Herpes simplex in eye infections.

Any departure from the above description which conforms to the present invention is intended to be included within the scope of the claims.

What is claimed is:

1. Compounds having the structure

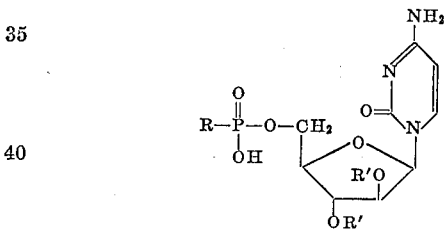

in which R is selected from the group consisting of

—RO''

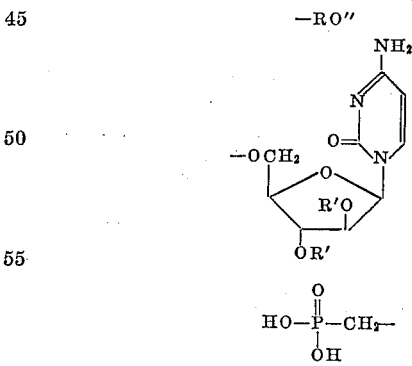

and

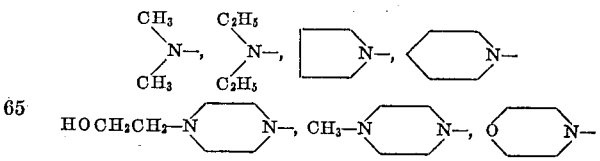

and R' is selected from the group consisting of —H, lower alkanoyl radicals and benzoyl, and R'' is selected from the group consisting of —H, lower alkyl radicals and phenyl-lower alkyl radicals.

2. The compounds according to claim 1 wherein R' is hydrogen.

3. The compounds according to claim 1 wherein R' is alkanoyl.

4. The compounds according to claim 1 wherein R' is benzoyl.

5. Compounds having the structure:

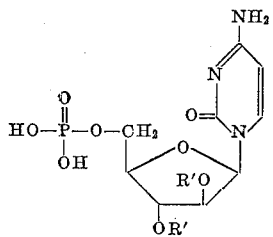

wherein R' is selected from the group consisting of hydrogen, lower alkanoyl, and benzoyl radicals.

6. Compounds having the structure:

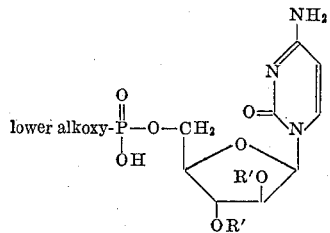

and R' is selected from the group consisting of —H, lower alkanoyl radicals and benzoyl.

7. Compounds having the structure:

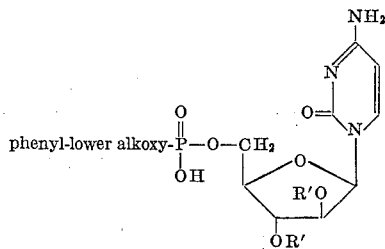

and R' is selected from the group consisting of —H, lower alkanoyl radicals and benzoyl.

8. Compounds having the structure:

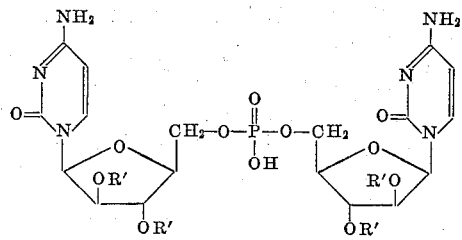

in which R' is selected from the group consisting of —H, lower alkanoyl radicals and benzoyl.

9. The compound according to claim 8 wherein R' is hydrogen.

10. Compounds having the structure:

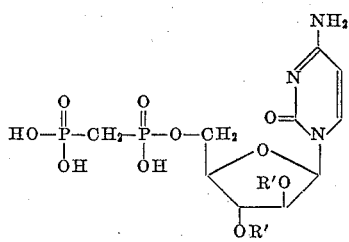

in which R' is selected from the group consisting of —H, lower alkanoyl radicals, and benzoyl.

11. Compounds having the structure:

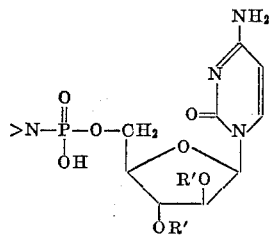

in which >N— is selected from the group consisting of di-lower alkylamino, and heterocyclic radicals containing from four to five atoms in addition to the nitrogen atom.

12. Compounds having the structure:

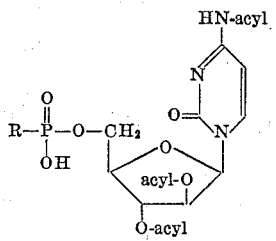

in which R is selected from the group consisting of:

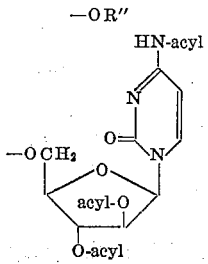

and

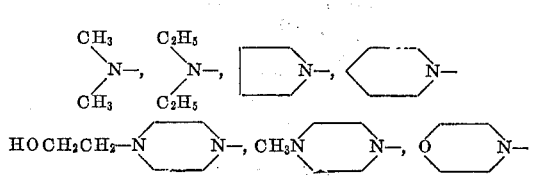

and R'' is selected from the group consisting of —H, lower alkyl radicals and phenyl-lower alkyl radicals.

13. Compounds having the structure:

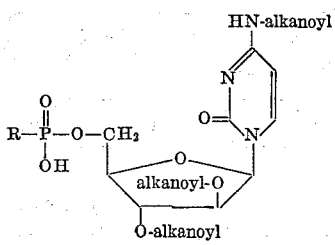

in which R is selected from the group consisting of:

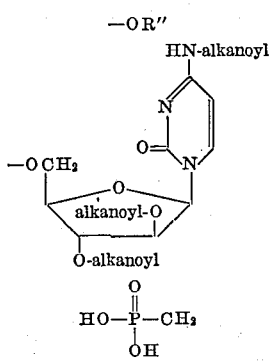

and

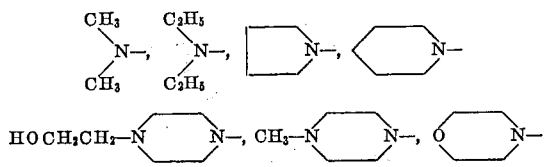

and R″ is selected from the group consisting of —H, lower alkyl radicals and phenyl-lower alkyl radicals.

14. Compounds having the structure:

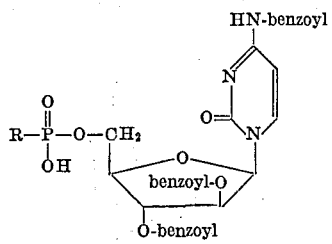

in which R is selected from the group consisting of:

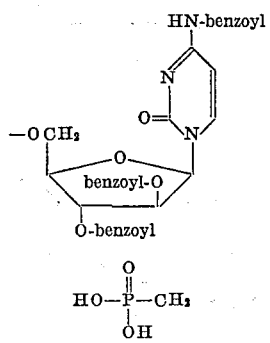

and

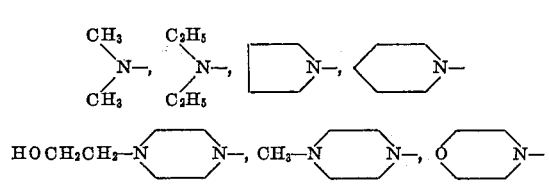

and R″ is selected from the group consisting of —H, lower alkyl radicals and phenyl-lower alkyl radicals.

15. The method of producing a bis-phosphate ester of the following structural formula

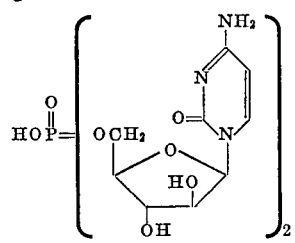

which comprises treating 1-β-D-arabofuranosylcytosine with a triarylmethylhalide to produce a trityl compound of the formula

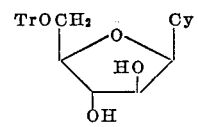

treating said trityl compound with an acylating agent containing a carboxylic acid acyl group to form an acylated compound of the formula

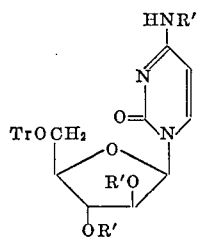

where R′ is the carboxylic acid acyl group of said acylating agent, treating said acylated compound with an arylphosphorodichloridate to obtain a compound of the formula

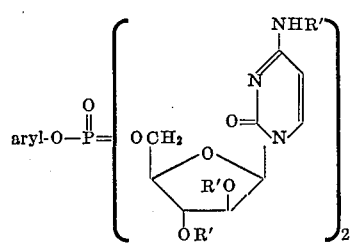

and treating the thus-obtained compound with base to form said bis-phosphate ester.

16. The method according to claim 15 wherein the triarylmethylhalide is triphenylmethylchloride.

17. The method according to claim 15 wherein the acylating agent is a lower alkanoylating agent.

18. The method according to claim 15 wherein the arylphosphorodichloridate is p-nitrophenylphosphorodichloridate and the base is an alkali metal hydroxide.

19. The method according to claim 15 wherein said acylated compound is treated with dilute acid prior to the treatment with said arylphosphorodichloridate.

20. The method according to claim 19 wherein the dilute acid is dilute acetic acid.

References Cited by the Examiner

UNITED STATES PATENTS

| | | | |
|---|---|---|---|
| 2,844,514 | 7/1958 | Morell et al. | 260—211.5 |
| 3,116,282 | 12/1963 | Hunter | 260—211.5 |
| 3,201,389 | 8/1965 | Fujimoto et al. | 260—211.5 |

OTHER REFERENCES

Michelson: "The Chemistry of Nucleosides and Nucleotides," 1963, page 213, Academic Press, New York, N.Y.

LEWIS GOTTS, *Primary Examiner.*

J. R. BROWN, *Assistant Examiner.*

UNITED STATES PATENT OFFICE
CERTIFICATE OF CORRECTION

Patent No. 3,284,440                                                    November 8, 1966

Arthur A. Patchett et al.

It is hereby certified that error appears in the above numbered patent requiring correction and that the said Letters Patent should read as corrected below.

Column 8, line 45, for "-RO''" read -- -OR' --; column 11 line 45, after "of:" insert -- -OR' --.

Signed and sealed this 29th day of August 1967.

(SEAL)
Attest:

ERNEST W. SWIDER                                       EDWARD J. BRENNER
Attesting Officer                                           Commissioner of Patents